United States Patent
Yudasaka

(10) Patent No.: US 10,417,536 B2
(45) Date of Patent: Sep. 17, 2019

(54) PRINTER WITH A DIVERSIFIED PRINTED OUTPUT AND CONTROL METHOD OF A PRINTER

(71) Applicant: SEIKO EPSON CORPORATION, Tokyo (JP)

(72) Inventor: Shingo Yudasaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 15/800,560

(22) Filed: Nov. 1, 2017

(65) Prior Publication Data
US 2018/0121771 A1 May 3, 2018

(30) Foreign Application Priority Data
Nov. 2, 2016 (JP) .................................. 2016-214913

(51) Int. Cl.
  *G06K 15/02* (2006.01)
  *G06K 15/00* (2006.01)
(52) U.S. Cl.
  CPC ..... *G06K 15/1828* (2013.01); *G06K 15/1801* (2013.01); *G06K 15/1802* (2013.01); *G06K 15/1809* (2013.01); *G06K 15/1827* (2013.01); *G06K 15/402* (2013.01); *G06K 2215/0022* (2013.01)

(58) Field of Classification Search
  CPC ........... G06K 15/1828; G06K 15/1801; G06K 15/402; G06K 15/1809; G06K 2215/0022
  See application file for complete search history.

(56) References Cited

U.S. PATENT DOCUMENTS

| 2007/0115488 | A1* | 5/2007 | Engelman ............. G06F 17/214 358/1.13 |
| 2011/0122438 | A1* | 5/2011 | Someya ................ G06F 3/1208 358/1.15 |
| 2016/0110146 | A1* | 4/2016 | Takagi .................. G06F 3/1208 358/1.11 |

FOREIGN PATENT DOCUMENTS

JP  2002-321403 A  11/2002

\* cited by examiner

*Primary Examiner* — Kent Yip
(74) *Attorney, Agent, or Firm* — Foley & Lardner LLP

(57) ABSTRACT

A printer has a print unit, a printer communicator, printer storage, and a printer controller. The controller controls the printer communicator to receive a print command that includes character data and a font command. The controller acquires font data for characters specified by the character data based on font data and relational information stored by the printer storage 21. The controller generates print data by applying a specific process related to the font type and controls the print unit based on the generated print data to print on a print medium.

12 Claims, 8 Drawing Sheets

| RELATIONAL INFORMATION | | |
|---|---|---|
| FONT TYPE | SPECIFIC PROCESS INFORMATION | PRINT FONT TYPE |

FIG. 6

PRINTER WITH A DIVERSIFIED PRINTED OUTPUT AND CONTROL METHOD OF A PRINTER

CROSS-REFERENCE TO RELATED APPLICATION

The present application claims priority to Japanese Application No. 2016-214913, filed on Nov. 2, 2016, which is hereby incorporated by reference in its entirety.

BACKGROUND

The invention relates to a printer and a control method of a printer.

Printers (color image processing devices) that print based on print commands (monochrome data), and when printing automatically print specific character strings in color, are known from the literature. See, for example, JP-A-2002-321403.

The printer disclosed in JP-A-2002-321403 only prints specific strings in color, and therefore can be improved to further diversify the printed output.

SUMMARY

An objective of the invention is to diversify the printed output from a printer capable of printing on print media.

To achieve the foregoing objective, a printer according to the invention includes: a print unit that prints on print media; a communicator that receives a print command including a font command specifying character data indicating specific characters, and the font type of the font data; storage that stores the font data; and a controller that controls the communicator to receive the print command, generates print data based on the received print commands and font data stored by the storage, and controls the print unit based on the generated print data to print on the print medium.

The storage stores relational information relating the font type, specific process information indicating a specific process, and a print font type. When a print command is received, the controller acquires the font data of the print font type linked to the font type specified by the font command included in the received print command, the font data correlated to the characters specified by the character data included in the received print command; and generates the print data by executing, on the acquired font data, the specific process indicated by the specific process information correlated to the font type specified by the font command included in the received print command.

By appropriately using the font commands included in a print command and specifying a font type, this configuration enables the printer to change the appearance of the printed output based on relational information stored in the storage and relating font type, specific process information indicating a specific process, and a print font type.

In another aspect of the invention, the font type and print font type relationally stored in the storage are different types.

This configuration enables controlling the printer to print characters in a font type that is different from the font type specified in the print command.

In another aspect of the invention, the controller does not execute the specific process when generating print data if a specific code is included in the characters specified by the character data contained in the received print command.

This configuration enables stopping execution of a specific process by including the specific code in the character string specified by the character data, without adding a new command for stopping executing a specific process.

In another aspect of the invention, when a specific code is included in the characters specified by the character data contained in the received print command, the font data acquired by the controller from the storage when the controller generates print data is font data of the font type specified by the font command contained in the received print command.

This configuration enables stopping printing based on the print font type by including a specific code in the character string of the character data without adding a new command for stopping printing based on the print font type.

In another aspect of the invention, the controller does not acquire the font data corresponding to the specific code when generating the print data.

This configuration enables the printer to appropriately print only the character string requiring printing.

In another aspect of the invention, the controller displays a screen for receiving input of settings related to the relational information stored by the storage, and updates the relational information based on input to the displayed screen.

This configuration enables the user to update the relational information by a simple method of inputting to an interface.

In another aspect of the invention, the controller, when specific access from an external device is detected, sends data for displaying the screen to the external device, and displays the screen on the external device.

This configuration enables the user, by accessing the printer from a host computer 2, to display a screen on the external device and update relational information through the interface.

In another aspect of the invention, the print unit can print in color; and the specific process includes a process of colorizing the font data when generating the print data.

This configuration uses the ability of the print unit to print in color to desirably colorize output.

Another aspect of the invention is a control method of a printer having a print unit that prints on print media, the control method including: storing relational information correlating font data and font type information to specific process information indicating a specific process, and a print font type; receiving a print command including character data specifying characters, and a font command specifying the font type of the font data; acquiring the font data of the print font type related to the font type specified by the font command, the font data corresponding to the characters identified by the character data contained in the received print command; generating print data by executing, on the acquired font data, the specific process indicated by the specific process information related to the font type specified by the font command contained in the received print command; and printing on the print medium by the print unit based on the generated print data.

By appropriately using font commands that specify a font type and are included in the print command, a printer according to this aspect of the invention can vary the printed output based on relational information stored in a storage unit and relating font type, specific process information indicating a specific process, and print font type information.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 shows an example of related information.

DESCRIPTION OF EMBODIMENTS

An embodiment of the present invention is described below with reference to the accompanying figures.

Figure 1:
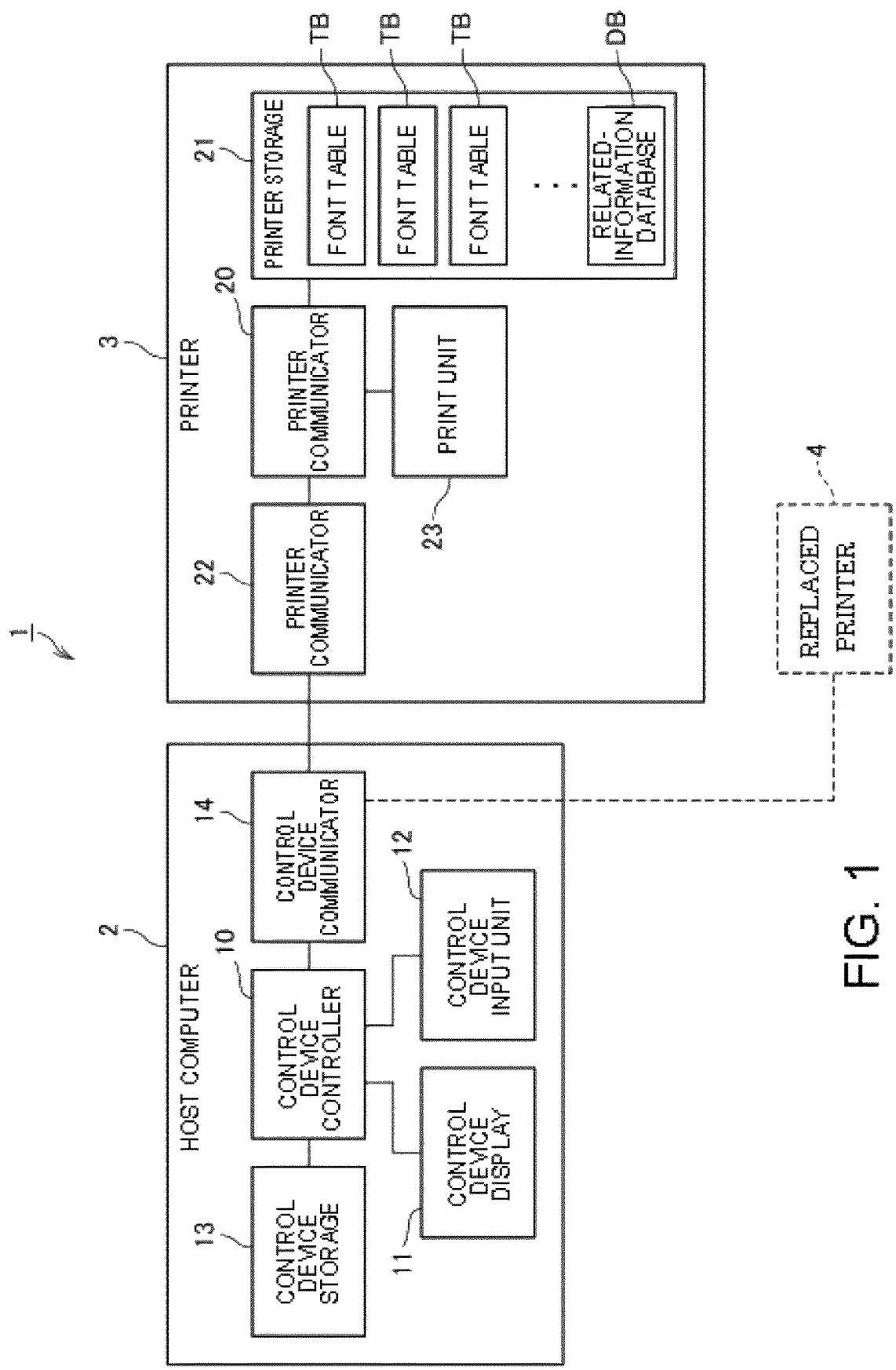
FIG. 1 is a block diagram illustrating the configuration of a printing system according to the invention.

FIG. 1 is a block diagram illustrating the configuration of a printing system 1 according to the invention.

As shown in FIG. 1, a printing system 1 according to this embodiment of the invention includes a host computer 2 (control device), and a printer 3 communicatively connected to the host computer 2.

The printer 3 in this example is an inkjet printer that holds ink cartridges for yellow (Y), magenta (M), cyan (C), and black (K) inks, and can print in color using the inks supplied from the respective ink cartridges. The host computer 2 has a storage compartment for storing roll paper (print media), and a cutter mechanism for cutting the roll paper, prints specific images on the roll paper, and cuts the roll paper at a specific position to produce strips of paper on which specific images are printed.

For example, the roll paper used in this printer 3 is label paper having labels of a specific size affixed to a continuous liner. The printer 3, as controlled by the host computer 2, prints images on the labels affixed to the liner, cuts the label paper appropriately, and produces labels.

The printing system 1 may also be disposed to checkout counters in supermarkets or restaurants, for example. The printer 3 in this configuration produces receipts and coupons according to the transaction completed at the checkout counter as controlled by the host computer 2.

Before the printer 3 was connected to the host computer 2, a another replaced printer 4 (also referred to below as the replaced printer) was connected to the host computer 2, and the host computer 2 controlled the replaced printer 4 to print. The replaced printer 4 in this example is a thermal printer or other monochrome printer that cannot print in color. As described above, the replacement printer 3 is a printer capable of color printing.

The printing system 1 according to this embodiment is a system designed with the following objectives.

(1) When the device connected to the host computer 2 is changed from the replaced printer 4 to the replacement printer 3, the printing system 1 enables printing with the printer 3 without changing the content of the data the host computer 2 sends to print, that is, without making any software modifications to the host computer 2 before or after installing the printer 3. As a result, the replaced printer 4 can be smoothly and easily replaced with the printer 3.

(2) Using the ability of the printer 3 to print in color, the printing system 1 can desirably colorize the printouts produced by the replaced printer 4

(3) Because the printouts from the printer 3 are changed dynamically by the printing system 1, diversity in the printouts is assured, the product value of the printer 3 is improved, and user convenience is improved for users reading the printouts.

As shown in FIG. 1, the host computer 2 has a control device controller 10, control device display 11, control device input unit 12, control device storage 13, and control device communicator 14.

The control device controller 10 includes a CPU, ROM, RAM, and other signal processing circuits not shown, and controls other parts of the host computer 2. The control device controller 10 executes processes by the cooperation of hardware and software, such as by a CPU reading and running a program copied from ROM to RAM, or by executing processes by functions of an ASIC, or by a signal processing circuit processing signals to execute processes.

The control device display 11 has an LCD or other display panel, and displays information on the display panel as controlled by the control device controller 10.

The control device input unit 12 includes operating switches, a keyboard, or other input means, detects operation of the input means, and outputs to the control device controller 10. The control device controller 10, based on input from the control device input unit 12, executes processes appropriate to operation of the input means.

The control device storage 13 includes nonvolatile memory and stores data.

The control device communicator 14 connects to the printer 3, and communicates with the printer 3 according to a specific communication protocol as controlled by the control device controller 10. The communication protocol used for communication between the host computer 2 and printer 3 may be a wired or a wireless communication protocol. Wired communication standards include, for example, a serial communication protocol such as USB, RS-232C, or other standard, a parallel communication protocol such as IEEE 1284, Ethernet®, or other standard. Wireless standards include Wi-Fi® or other wireless LAN standard, or Bluetooth® or other near-field communication standard.

As shown in FIG. 1 the printer 3 includes a printer controller 20 (controller), printer storage 21 (storage), printer communicator 22 (communicator), and print unit 23.

The printer controller 20 includes a CPU, ROM, RAM, and other signal processing circuits not shown, and controls other parts of the host computer 2. The printer controller 20 executes processes by the cooperation of hardware and software, such as by a CPU reading and running a program copied from ROM to RAM, or by executing processes by functions of an ASIC, or by a signal processing circuit processing signals to execute processes.

The printer storage 21 includes nonvolatile memory and stores data. The data stored by the printer storage 21 is described below.

The printer communicator 22 connects to the host computer 2, and communicates with the host computer 2 according to a specific communication protocol as controlled by the printer controller 20.

The print unit 23 includes a print mechanism, conveyance mechanism, and cutting mechanism. The print mechanism in this example includes an inkjet head and other printing-related elements for printing images by ejecting ink from ink cartridges of different colors and forming dots on the roll paper. The conveyance mechanism includes conveyance rollers and other elements related to conveying roll paper in a specific direction from a paper roll stored in the printer 3.

The cutting mechanism includes a cutter for cutting the roll paper and other elements related to cutting roll paper. The print unit 23, as controlled by the printer controller 20, conveys the roll paper in a specific direction by the conveyance mechanism, prints images on the roll paper by the print mechanism, cuts the roll paper at a specific position by the cutting mechanism, and thereby produces strips of paper on which images are printed.

As described above, the printer 3, as controlled by the host computer 2, prints images on roll paper. More specifically, the printer 3 can print a character string as an image. In this example a character string is a combination of one or more characters. Also in this example, a character is an object to which a character code is assigned and which can be converted to font data as described below.

The operation of the printer 3 and host computer 2 when the printer 3 prints one line of characters (the string printed on one line) as controlled by the host computer 2 is described below.

As will be understood below, the printer 3, using properties of data sent by the host computer 2, applies color as desired and dynamically changes the printout.

Figure 2:
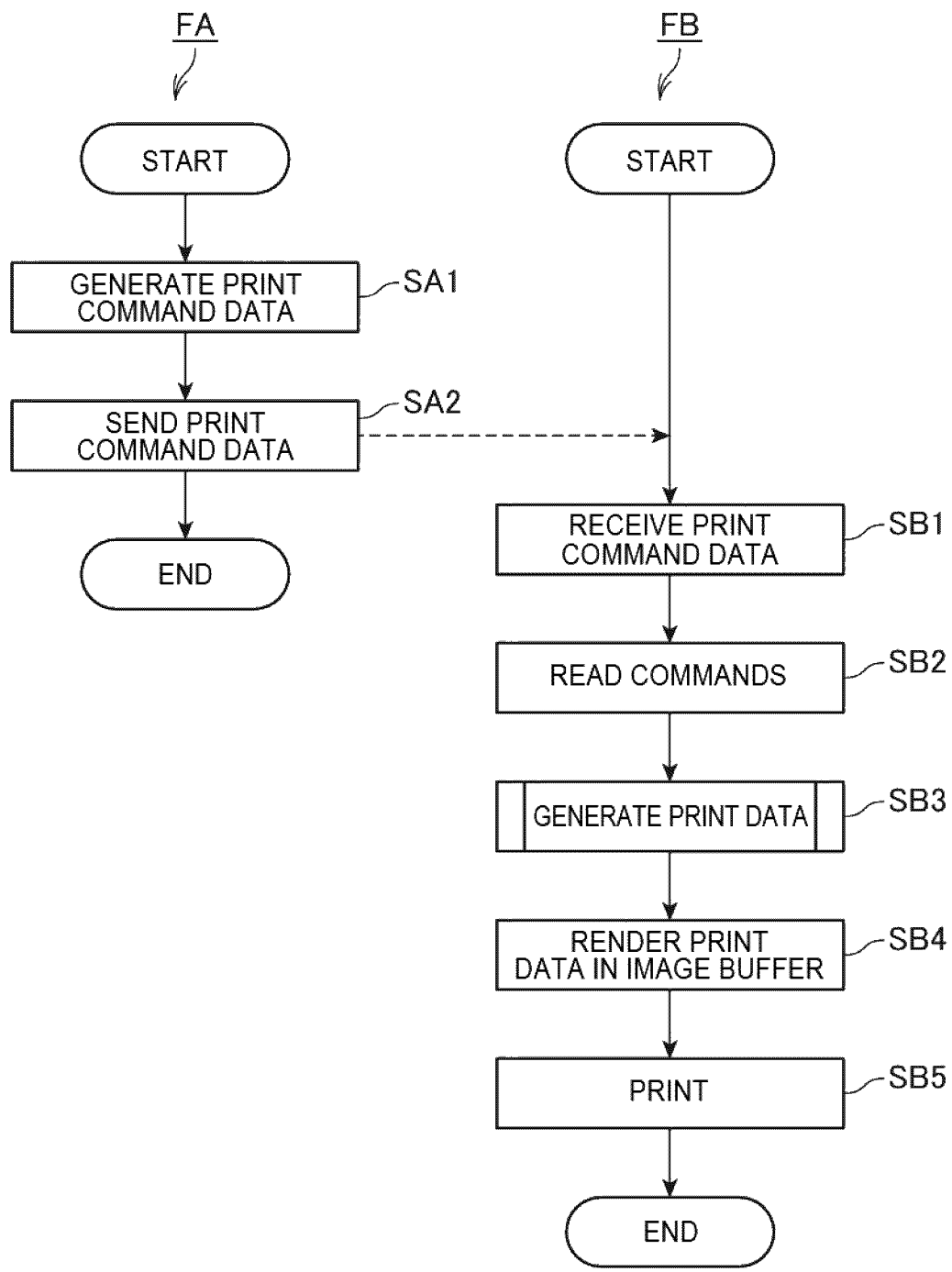
FIG. 2 is a flow chart of the operation of the host computer and printer.

FIG. 2 is a flow chart of the operation of the host computer 2 and printer 3 when the printer 3 prints one line of characters (the string printed on one line) as controlled by the host computer 2. In FIG. 2, column FA is a flow chart of the operation of the host computer 2, and column FB is a flow chart of the operation of the printer 3.

As shown in column FA in FIG. 2, the control device controller 10 of the host computer 2 generates print command data SD (print commands) instructing printing (step SA1). In this example, the print command data SD is data instructing printing a string on one line.

A specific application and a printer driver for the replaced printer 4 are installed on the host computer 2. In step SA1, the control device controller 10 generates the print command data SD using functions of the application and functions of the printer driver.

In other words, in step SA1 the application acquires the string the printer 3 is to print, and style commands instructing styles to apply to the string when printing. The application, based on information input from the user, information input from an external device, or information set in advance, acquires at least the string the printer 3 is to print (a combination of the character codes of the characters in the string to print), the styles to be applied to the string when printing, and the font type of the printed string. The user, by a specific means, can specify through the application the string for the printer 3 to print. Next, the application outputs, to the printer driver, information indicating the string, information indicating the styles, information indicating the font, and other information required by the printer driver to generate the print command data SD. The printer driver, based on the information input from the application, generates the print command data SD.

Figure 4:
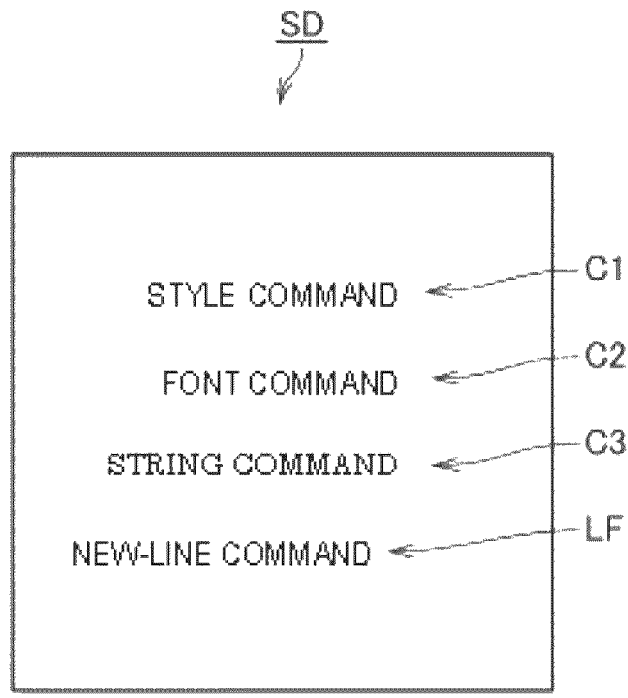
FIG. 4 illustrates content of print command data.

FIG. 4 shows an example of the content of a print command data SD commanding printing a line of characters. The print command data SD is generated by a function of a printer driver appropriate for the replaced printer 4. The print command data SD therefore comprises commands in the command language of the replaced printer 4, and in this example does not contain information for printing color.

As shown in the example in FIG. 4, the print command data SD specifying printing a one-line string of characters includes a style command C1, font command C2, string command C3, and new-line command LF.

The style command C1 is a command defining what styles to apply to the string when printing the string. Styles that may be applied to the string in this example include enlarging and reducing the character size, left justification, center justification, right justification, and adding bold, underline, strike-through, or emphasis marks. Styles specified by the style command C1 do not, however, include color-related styles, such as to change the color from black to another color.

The font command C2 is a command specifying the font to apply to the printed string.

The string command C3 is a command including the character code of each character in the string to print. The string command C3 is an example of character data.

The new-line command LF instructs starting a new line.

When the printer 3 is instructed to print strings on multiple lines, the print command data SD comprises a style command C1, font command C2, string command C3, and new-line command LF group for each line to print. In addition to character strings, the printer 3 can also print graphic images and barcode images. When printing a non-character image such as a graphic or barcode image, the print command data SD includes commands required to print the image.

After generating the print command data SD in step SA1, the control device controller 10 controls the control device communicator 14 to send the generated print command data SD to the printer 3 (step SA2).

As shown in FIG. 2 column FB, the printer controller 20 of the printer 3 controls the printer communicator 22 to receive the print command data SD the host computer 2 transmitted in step SA2 (step SB1). Each of the commands contained in the received print command data SD is sequentially stored to a receive buffer not shown.

Next, the printer controller 20 sequentially reads the commands contained in the print command data SD from the receive buffer (step SB2). In this example, in step SB2, the printer controller 20 sequentially reads the style command C1, font command C2, string command C3, and new-line command LF carried in the print command data SD.

Next, the printer controller 20, based on the commands contained in the print command data SD and read in step SB2, generates print data, which is image data that can be rendered in an image buffer not shown (step SB3). Generating print data in this embodiment is described below.

Next, the printer controller 20 renders the generated print data in an image buffer (step SB4).

Next, the printer controller 20 controls the print unit 23 based on the print data rendered in the image buffer, and prints the string (as described below, this is referred to as a print target string and includes the characters in the string specified by the string command C3, except for characters of a first code and a second code) on roll paper (step SB5).

Figure 3:
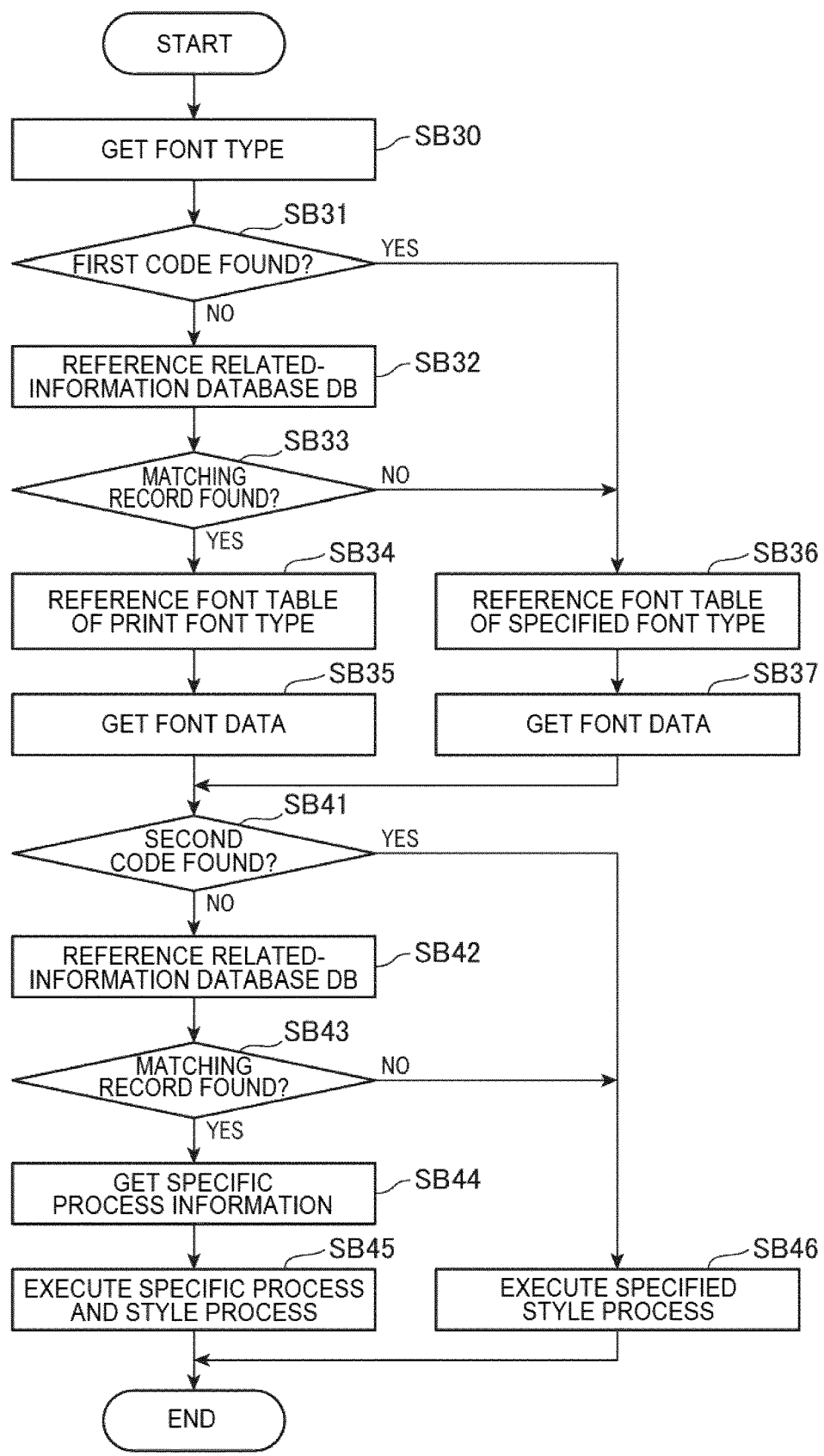
FIG. 3 is a flow chart of the operation of the printer.

FIG. 3 is a flow chart of the operation of the printer when generating the print data in step SB3.

As shown in FIG. 3, the printer controller 20 references the font command C2 read in step SB2, and acquires the font type specified by the command (step SB30).

Next, the printer controller 20 references the string command C3 that was read, and determines if the first code (specific code) is contained at a specific position in the string specified by the string command C3 (step SB31). Below, the string specified by the string command C3 is referred to as the specified string.

The first code is a string comprising a specific combination of characters. The first code may be a single character. For example, the first code may be the string @@. Note that the characters of the first code and the characters of the second code are removed from the target characters to be printed, and are not printed. As a result, of the specified string, the substring not including the first code and second code is referred to as the print target string.

Figure 5A:
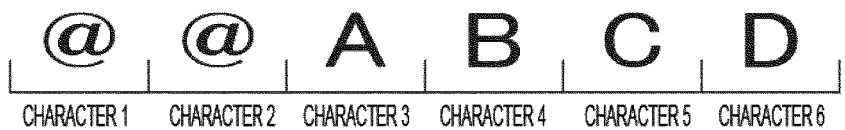
FIG. 5A shows an example of a specified string.

For example, if the first code is the string @@ and the position specified as the location of the first code in the specified string is the beginning of the specified string, then in the case that the first character in the specified string is the @ character and the second character in the specified string is the @ character, then the printer controller 20 determines in step SB31 that the first code is included at the specific position in the specified string. More specifically, if the specified string is the string shown in FIG. 5A, the printer controller 20, in step SB31, determines that the first code is included at the specific position in the specified string.

As described below, the first code is a code instructing to not print based on the font data of the print font type (described below). Therefore, by including the first code at the specific position in the specified string, the user can block printing based on the font data of the print font type when printing the print target string contained in the same specified string.

The first code is information used to determine whether or not to print based on the font data of the print font type, and is a string that is not printed. As a result, the first code is preferably a string that will never be printed, or has an extremely low probability of being printed, by the host computer 2.

Note that the print font type is the type of font data used when the printer 3 actually prints.

If step SB31 determines the first code is not at the specific position in the specified string (step SB31: NO), the printer controller 20 references the related-information database DB (step SB32).

FIG. 6 schematically illustrates information stored in each record of the related-information database DB.

The related-information database DB is a database having a record for each font type. The font types registered in the records of the related-information database DB do not need to be all font types that can be specified by the font command C2: records relating to optional font types desired by the user are registered in the related-information database DB.

As shown in FIG. 6, each record in the related-information database DB relates the font type to specific process information, and the print font type.

As described more fully below, the specific process information is information specifying the specific process the printer controller 20 executes when the second code is not included in the specified string.

As described more fully below, the print font type is information specifying a font type in the font table TB that the printer controller 20 targets when acquiring font data, when the first code is not included in the specified string.

As described below, the user can register a new record for a specific font type in the related-information database DB, and delete a record corresponding to a specific font type from the records already stored in the related-information database DB. The user can also change the content of desired information contained in the related information of a specific record already stored in the related-information database DB.

After referencing the related-information database DB in step SB32, the printer controller 20 determines whether or not the database contains a record corresponding to the font type acquired in step SB30 (step SB33).

If a record corresponding to the font type acquired in step SB30 is stored in the related-information database DB (step SB33: YES), the printer controller 20 references the font table TB for the print font type identified by the relational information in that record, instead of referencing the font table TB of the font type specified by the font command C2 (step SB34). The print font type of the font type of the font table TB referenced in step SB34 is an example of a print font type related to the acquired font type.

A font table TB is a table storing sets of font data. The font data is data including information required to render characters in an image buffer as data expressing the characters written as a combination of dots. The data format of the font data in this embodiment of the invention is a bitmap format expressing characters as a combination of dots of a specific size. The data format of the font data is not limited to bitmap, however, and may be scalable font data, vector font data, or outline font data, for example.

The printer storage 21 stores a font table TB for each font type that can be specified by the font command C2. For example, if the font types that can be declared by the font command C2 are Arial, Italic, and Rockwell, the printer storage 21 stores a font table TB for each of these font types.

Next, the printer controller 20 acquires, from the font table TB referenced in step SB34, the font data for each character in the substring (print target string) not including the first code and second code (described below) in the string (specified string) specified by the string command C3 (step SB35). The printer storage 21 stores information managing the relationship between character codes and the font data stored in each font table TB. In step SB7, the printer controller 20, based on this information, converts the character code of each character in the print target string to font data.

In this way, the printer controller 20 does not acquire font data related to the first code and second code (specific code) when generating the print data.

However, if step SB31 determines the first code is included at the specific position in the specified string (step SB31: YES), or if in step SB33 a record corresponding to the font type acquired in step SB30 is not stored in the related-information database DB (step SB33: NO), the printer controller 20 executes step SB36 to step SB37.

In step SB36, the printer controller 20 references the font table TB for the font type acquired in step SB30.

In step SB36, the printer controller 20, after referencing the font table TB for the font type acquired in step SB30, acquires from the referenced font table TB the font data for each character in the sub string (print target string) not including the first code and second code in the string (specified string) specified by the string command C3 (step SB37).

After acquiring the font data in step SB35 or step SB37, the printer controller 20 determines whether or not the second code is included in the specified string at a specific position (step SB41).

The second code is a string different from the first code, and is a character string comprising a combination of specific characters. The second code may also be a single character. For example, the second code in this embodiment is the string ##. If the first code is not included in the specified string, the specific position of the second code in the specified string may be set to the beginning of the specified string, for example.

Figure 5B:
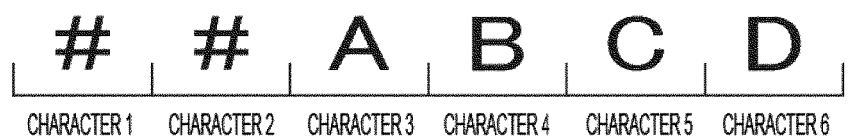
FIG. 5B shows an example of a specified string.

For example, if the second code is the string ##, and the specific position of the second code in the specified string is the beginning of the specified string, then the printer controller 20 determines that the second code is included at the specific position in the specified string when in step SB41 the first character of the specified string is #, and the second character of the specified string is also #. In a more specific example, when the specified string is the string shown in FIG. 5B, the printer controller 20, in step SB41, determines the second code is contained at the specific position in the specified string.

When the first code is included in the specified string, the specific position of the second code in the specified string may follow the first code, for example.

Figure 5C:
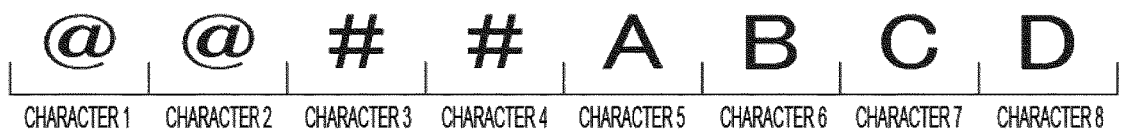
FIG. 5C shows an example of a specified string.

Suppose, for example, the first code is the string @@, the position specified as the location of the first code in the specified string is the beginning of the specified string, the second code is the string ##, and the position specified as the location of the second code in the specified string is the position following the first code in the specified string. In this case, in step SB41, the printer controller 20 determines the second code is included at the specific position in the specified string when in step SB41 the third character in the specified string is #, and the fourth character in the specified string is also #. More specifically, if the specified string is the string shown in FIG. 5C, the printer controller 20, in step SB41, determines the second code is included at the specific position in the specified string.

As described below, the second code is a code instructing that a specific process (described below) does not execute. Therefore, the user, by including the second code at a specific position in the specified string, can prevent a specific process from executing when printing the print target string included in the specified string.

If it is determined in step SB41 that the second code is not included at the specific position in the specified string (step SB41: NO), the printer controller 20 references the related-information database DB (step SB42).

Next, the printer controller 20 determines if a record corresponding to the font type acquired in step SB30 is already registered in the related-information database DB (step SB43).

If a record corresponding to the font type acquired in step SB30 is registered in the related-information database DB (step SB43: YES), the printer controller 20 acquires the specific process information from the related information in that record (step SB44). The specific process information acquired in step SB44 is an example of specific process information related to the acquired font type.

The specific process information is described next.

As described above, the specific process information is information indicating a specific process for the printer controller 20 to execute (referred to below as the specific process).

The specific process refers to an image process the printer controller 20 applies to the font data when generating the print data. Included in specific processes in this embodiment of the invention are processes for colorizing font data. A process of colorizing font data is described below.

More specifically, as described above, font data in this example is bitmap data wherein dots having a gradation value for a specific gradation indicating the hue of a particular color are arranged in a dot matrix pattern. The font data includes dots for which ink is not ejected (referred to below as colorless dots), and dots formed by ejecting ink (referred to below as color dots), in a dot matrix pattern, and characters are formed by the specific combination of color dots. Based thereon, a process that colorizes font data means adjusting the gradation value indicating the hue of a particular color to form color dots in the font data as dots of a specific color. As a result, the color of a character printed based on the font data can be made a specific color.

The specific process is not limited to colorizing font data. For example, the specific process may be a process that enlarges the size of the font data, or a process that reduces the size of the font data. The specific process may also include multiple processes. The specific process may also include a process that cancels the image process corresponding to the style specified by the style command C1.

Various processes using the color printing capability of the printer 3 may also be included in the specific process. For example, an image process applied to font data to fill the background of characters with a specific color other than black, an image process applied to font data to add emphasis marks of a specific color other than black, or an image process applied to font data to add an underline of a specific color other than black, may be included.

Next, the printer controller 20 applies the specific process identified by the specific process information acquired in step SB44, and an image process corresponding to the style specified by the style command C1, to the combination of font data acquired in step SB35 or step SB37 (step SB45), and finishes generating print data.

For example, if the specific process indicated by the specific process information is a process that making the font data blue, the printer controller 20 executes the following process. That is, for the font data acquired in step SB35 or step SB37, the printer controller 20 adjusts the gradation value expressing the hue of each color of the color dots to make the dots blue. As a result, each character printed based on the font data is printed blue.

If the specific process indicated by the specific process information is a process that cancels the image process corresponding to the style specified by the style command C1, the printer controller 20 cancels that image process.

If in step SB41 it is determined that the second code is included in the specified string at the specific position (step SB41: YES), or step SB43 determines that a record corresponding to the font type acquired in step SB30 is not in the related-information database DB (step SB43: NO), the printer controller 20 goes to SB46.

That is, the printer controller 20 applies the image process corresponding to the style specified by the style command C1 to the combination of font data acquired in step SB35 or step SB37 (step SB46). This completes generating print data.

As described above, if a first code is included in the specified string and the second code is not included, the printer controller 20 applies a specific process, which is indicated by the specific process information related to the font type specified by the font command C2, to the font data of the print font type related to the font type specified by the font command C2 when generating print data. The effect of executing this specific process is described below.

More specifically, by the user registering, in the related-information database DB, records relating 1) one font type, 2) specific process information indicating a desired specific process and 3) a desired print font type to each other, when the printer 3 receives print command data including a font command C2 specifying the one font type, then the printer 3 can be controlled to apply the desired specific process to the font data of the desired print font type. In other words, without changing the content of the print command data SD transmitted by the host computer 2, the user can dynamically change the font type of the character string to be printed, and can control the printer 3 to execute a specific process to dynamically change the printout. In addition, the same effect can be achieved when a first code is included in a specified string, and when a second code is included in a specified string.

When the first code is included in the specified string, the printer controller 20 does not print based on the font data of the print font type. The effect of executing this process is described next.

Specifically, by the user registering in the related-information database DB records relating one font type to specific process information indicating a desired specific process, when the printer 3 receives print command data including a font command C2 specifying the one font type, the printer 3 can be controlled to execute the desired specific process. In other words, without changing the content of the print command data SD transmitted by the host computer 2, the user can cause the printer 3 to execute a specific process, and can dynamically change the printout.

The specific process may also include a process for colorizing font data. As a result, color can be desirably applied to character strings. More particularly, this embodiment can colorize or not colorize characters based on the content of the font type specified by the font command C2 contained in the print command data. As a result, because information specifying the font type is included in the information received to print a character string, a device that prints characters based on stored font data, such as the printer 3 according to this embodiment, can desirably colorize the printout.

Furthermore, when the first code is not included in the specified string, the printer controller 20 prints based on the font data of the print font type correlated to the font type specified by the font command C2, instead of the font type specified by the font command C2. The effect of this process is described next.

More specifically, by the user registering in the related-information database DB records relating one font type to a desired print font type, when the printer 3 receives print command data including a font command C2 specifying the one font type, the printer 3 can be controlled to print the string using a desired print font type that is different from the one font type. In other words, without changing the content of the print command data SD transmitted by the host computer 2, the font type of the printed string can be changed dynamically. Furthermore, the user can prevent executing a specific process (described below) by specifying a string that does not contain the second code as the character string to print.

Furthermore, when both the first code and second code are included in the specified string, the printer controller 20 prints the print target string based on the font data of the font type specified by the font command C2, instead of executing the specific process (described below) and printing based on the font data of the print font type (described below). The effect of this process is described next.

That is, by specifying a string including both the first code and second code as the string to print, the user can prevent executing the specific process (described below) and printing based on the font data of the print font type (described below).

As described above, the user can also register new records corresponding to specific font types in the database, and can delete a record corresponding to a specific font type from the records already stored in the related-information database DB. The user can also change (edit) the content of desired information included in the related information of a specific record already registered in the related-information database DB. Registering records in the related-information database DB, deleting records from the database, and changing the content of information included in registered records are also referred to herein as updating the related-information database DB.

Operation of the host computer 2 and printer 3 when the related-information database DB is updated according to user commands is described next.

Figure 7:
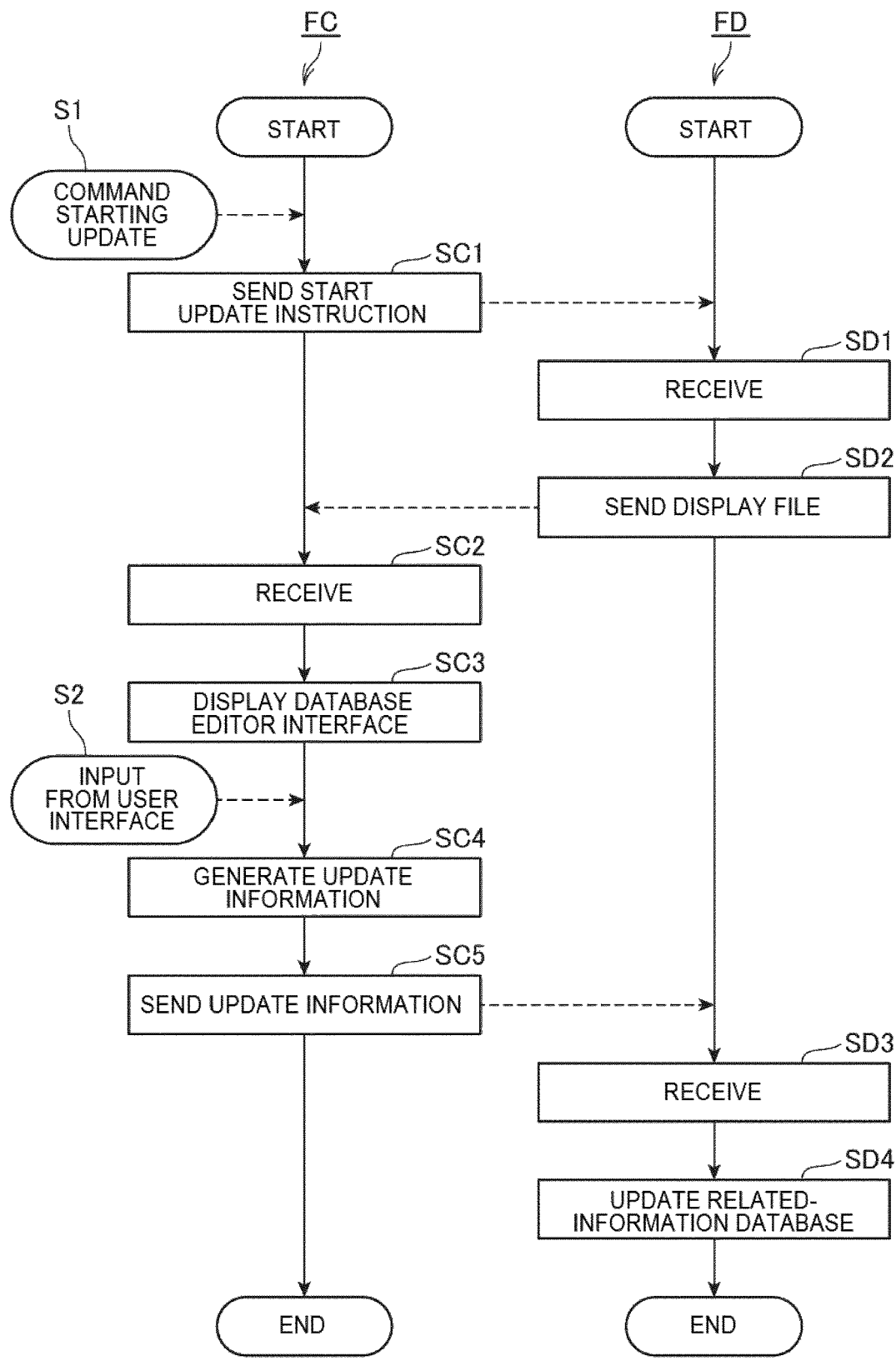
FIG. 7 is a flow chart of operation of the host computer and printer.

FIG. 7 is a flow chart of the operation of the host computer 2 and printer 3 when updating the related-information database DB. In FIG. 7, the operation of the host computer 2 is shown in column FC, and the operation of the printer 3 is shown in column FD.

To update the related-information database DB, the user first operates a specific input means of the host computer 2 and inputs to the host computer 2 a command to start updating the related-information database DB (step S1).

As shown in FIG. 7 column FC, when a user command to update the related-information database DB is detected, the control device controller 10 of the host computer 2 controls the control device communicator 14 to send a start update instruction, which indicates the user input a command to start updating the related-information database DB, to the printer 3 (step SC1).

As shown in FIG. 7 column FD, the printer controller 20 of the printer 3 then controls the printer communicator 22 to receive the start update instruction (step SD1).

Receiving a start update instruction is an example of specific access by an external device.

Triggered by receiving a start update instruction, the printer controller 20 generates a display file (data) for displaying a database editor interface UI for editing the database, and sends the generated display file to the host computer 2 (step SD2).

Note that the data format of the display file is not specifically limited. For example, if HTTP transmission is performed between the printer 3 and the host computer 2, with the host computer 2 as a client device and the printer 3 as the server, the display file may be an HTML file.

As shown in FIG. 7 column FC, the control device controller 10 of the host computer 2 then controls the control device communicator 14 to receive the display file (step SC2).

Next, the control device controller 10 controls the control device display 11 to display the database editor interface UI based on the received display file (step SC3).

Figure 8:
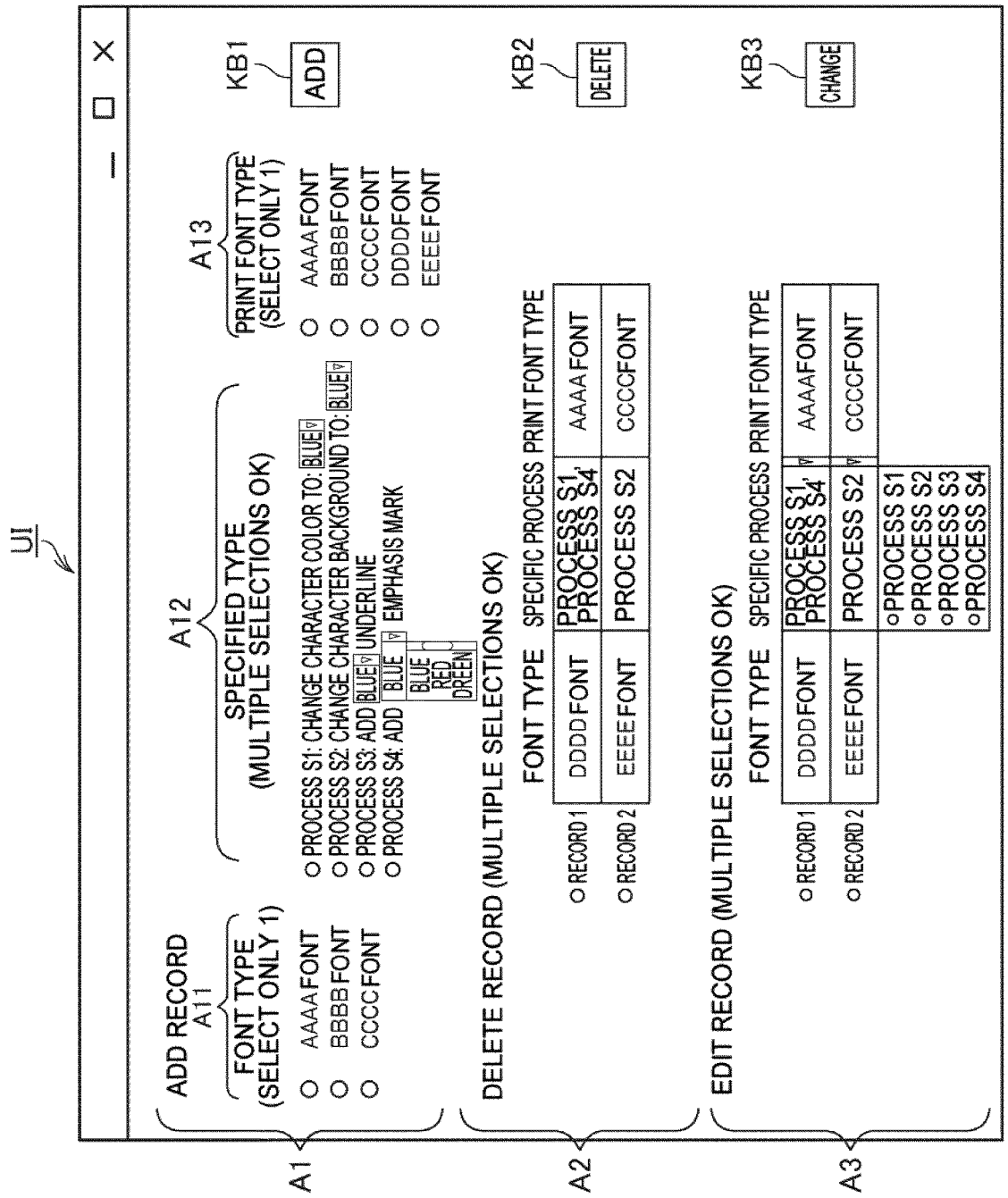
FIG. 8 shows an example of a user interface for updating.

FIG. 8 shows an example of the database editor interface UI.

As shown in FIG. 8, the database editor interface UI has a first display area A1, second display area A2, and third display area A3.

The first display area A1 is the area for inputting information when adding a record to the related-information database DB. As shown in FIG. 8, the first display area A1 has fields A11, A12, and A13.

Field A11 is the area for specifying the font type of the new record (the record to add). Displayed in field A11 is a list of font types other than the font types related to records that are already stored, and a radio button corresponding to each font type. By selecting from the group of radio buttons corresponding to the font types the radio button for the desired font type, the user specifies the font type of the new (added) record.

Field A12 is the field for setting the specific process indicated by the specific process information of the new record. Displayed in field A12 are, for each specific process that can be selected, a list of information describing the content of the specific process, and a corresponding radio button for selecting the information describing the content of the desired specific process. By selecting one or more radio buttons corresponding to the desired content from the group of radio buttons corresponding to the information describing the content of the desired specific process, the user specifies the one or more specific processes indicated by the specific process information. Note that the information describing the content of the specific process in this example enables selecting the color to use for printing in a process that changes the print color to a color other than black.

Field A13 is the area for selecting the print font type in the new record. Displayed in field A13 is a list of print font types that can be selected, and a radio button for each print font type. By selecting one radio button from the radio buttons for the multiple print font types, the user specifies the print font type of the new record.

As shown in FIG. 8, a Confirm button KB1 for confirming input to first display area A1 is also displayed in first display area A1. When adding a record to the related-information database DB, the user operates the Confirm button KB1 to confirm the input to the first display area A1 (step S2). When operation of the Confirm button KB1 is detected, the control device controller 10, based on the user input, creates update information including information related to the record to add (step SC4).

The second display area A2 is the area for inputting information when deleting a record from the related-information database DB. As shown in FIG. 8, displayed in second display area A2 are a list of the related information of records registered in the related-information database DB, and a corresponding radio button for selecting a specific record. By selecting one or more radio buttons from the radio buttons displayed for the corresponding records, the user specifies records to delete.

As shown in FIG. 8, a confirm button KB2 for confirming input to second display area A2 is also displayed in second display area A2. When deleting a record from the related-information database DB, the user operates the Confirm button KB2 to confirm the input to the second display area A2 (step S2). When operation of the confirm button KB2 is detected, the control device controller 10, based on the user input, creates update information including information related to the record to delete (step SC4).

The third display area A3 is the area for inputting information when changing the content of the related information in a record of the related-information database DB. As shown in FIG. 8, displayed in third display area A3 are a list of the related information of records registered in the related-information database DB, and a corresponding radio button for selecting a specific record. By selecting one or more radio buttons from the radio buttons displayed for the corresponding records, the user specifies records with related information whose content is to be edited.

The content of the specific process information and print font type contained in the related information shown in the third display area A3 can be edited by selecting information from a pull-down menu. By selecting the desired items displayed in the pull-down menu, the user can change the content of the specific process information and print font type.

As shown in FIG. 8, a confirm button KB3 for confirming input to the third display area A3 is also displayed in the third display area A3. When the user changes the content of the related information of a record stored in the related-information database DB, the user operates the confirm button KB3 to confirm the input to the third display area A3 (step S2). When operation of the confirm button KB3 is detected, the control device controller 10 generates, based on the user input, update information including information related to the record with the content to change (step SC4).

After generating the update information in step SC4, the control device controller 10 controls the control device controller 10 to send the generated update information to the printer 3 (step SC5).

As shown in FIG. 7 column FD, the printer controller 20 of the printer 3 controls the printer communicator 22 to receive the update information (step SD3).

Next, the printer controller 20 updates the related-information database DB based on the received update information (step SD4). For example, if the update information is information related to deleting a record, the printer controller 20 finds the record to delete based on the update information, and deletes the specified record.

As described above, the user can update the related-information database DB by the simple method of inputting to a database editor interface UI displayed on the host computer 2 by a function of the printer 3.

As described above, the printer 3 according to this embodiment has a print unit 23 that prints on roll paper (print media); a printer communicator 22 (communicator) that receives print command data (print commands) including a string command C3 (character data) specifying characters, and a font command C2 specifying the font type of the font data; a printer storage 21 (storage) that stores font data; and a printer controller 20 (controller) that controls the printer communicator 22 to receive print command data, generates print data based on the received print command data and font data stored by the printer storage 21, and controls the print unit 23 based on the generated print data to print on roll paper.

The printer storage 21 stores related information including a font type, specific process information indicating a specific process, and a print font type.

When print command data is received, the printer controller 20 acquires the font type indicated by the font command C2 included in the received print command data, acquires the print font type corresponding to the acquired font type, and for the characters specified by the string command C3, acquires the font data for the acquired print font type, and generates print data by applying, to the acquired font data, a specific process indicated by the specific process information related to the acquired font type.

By desirably using the font command C2 that is included in the print command data and that specifies a font type, this configuration enables the printer 3 to change the printout based on a font type stored by the printer storage 21, specific process information indicating a specific process, and the related print font type.

This embodiment also enables making the print font type different from the font type stored relationally thereto in the printer storage 21.

This configuration enables making the printer 3 print characters using a different font type than the font type specified by the print command data.

Furthermore, when a second code (specific code) is included in the string command C3 of the received print command data, the printer controller 20 in this embodiment does not execute the specific process when generating print data.

This configuration can stop execution of a specific process without adding a new command for stopping execution of a specific process by including the second code in the string specified by the string command C3.

When a first code (specific code) is included in the string command C3 contained in the received print command data, the printer controller 20 in this embodiment, when generating print data, does not acquire the print font type linked to the acquired font type, and for the characters specified by the string command C3, acquires the font data of the font type specified by the font command C2 included in the received print command data.

This configuration enables stopping printing based on the print font type by including the first code in the string specified by the string command C3 instead of adding a new command for stopping printing based on the print font type.

When generating print data, the printer controller 20 in this embodiment does not acquire font data corresponding to the first code and second code.

As a result, the printer 3 can desirably print only the string that requires printing.

The printer controller 20 in this embodiment also displays a database editor interface UI (screen) for receiving input of settings related to the related information stored by the printer storage 21, and updates the related information based on the input to the displayed database editor interface UI.

As a result, the user can update the related information by the simple method of inputting to a database editor interface UI.

When accessed in a specific way by the host computer 2 (external device), the printer controller 20 in this embodiment sends a display file (data) for displaying the database editor interface UI on the host computer 2, and causes the host computer 2 to display the database editor interface UI.

This configuration enables the user to display a database editor interface UI on the host computer 2, and use the user interface to update related information, by accessing the printer 3 from the host computer 2.

The print unit 23 in this embodiment of the invention can print in color. The specific process indicated by the specific process information includes a process of colorizing the font data when generating the print data.

This configuration can desirably colorize a printout by effectively using the ability of the print unit 23 to print color.

The invention is described above with reference to a preferred embodiment thereof, but the invention is not limited thereto and can be modified and adapted in many ways without departing from the scope of the accompanying claims.

For example, the external device that requests a display file for the database editor interface UI from the printer 3, and displays the database editor interface UI based on the display file, is the host computer 2 in this embodiment. However, the external device is not limited to a host computer 2, and may be any device that can access the printer 3.

The function blocks shown in FIG. 1 can also be achieved by the cooperation of hardware and software, and do not suggest a specific hardware configuration. The devices may also execute the operations by running a program stored on an externally connected storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer comprising:
   a print head configured to print an image on a print medium;
   a communicator that receives a print command including a font command and character data, the font command specifying a font type and the character data specifying characters;
   storage that stores font data in a font table and relational information, the relational information indicating a relationship between the font type and a specific process corresponding to the font type; and
   a controller that
      controls the communicator to receive the print command including the font command and the character data,
      acquires, from the font table for the font type specified according to the font command, the font data for the characters specified by the character data in the print command,
      generates print data by applying, to the acquired font data, the specific process corresponding to the font type specified by the font command according to the relational information, and
      controls the print head based on the generated print data to print on the print medium,
   wherein, when a specific code is included in the characters specified by the character data contained in the received print command, the controller generates the print data to include font data to which the specific process is not applied.

2. The printer described in claim 1, wherein:
   the relational information indicates a relationship between the font type specified by the font command and a print font type corresponding to the font type; and
   the controller acquires, from the font table for the print font type corresponding to the font type specified by the font command according to the relational information, the font data for the characters specified by the character data in the print command.

3. The printer described in claim 2, wherein:
   the controller, when a specific code is included in the characters specified by the character data contained in the received print command, generates the print data to include the font data of the font type specified by the font command.

4. The printer described in claim 1, wherein: the controller generates the print data to not include the font data for the specific code.

5. The printer described in claim 1, wherein:
   the controller displays a screen for receiving input to set the relationship between the font type and the specific process corresponding to the font type, and updates the relational information stored in the storage based on the input to the displayed screen.

6. The printer described in claim 5, wherein:
   the controller, when specific access from an external device is detected, sends data for displaying the screen to the external device, and displays the screen on the external device.

7. A printer comprising:
   a print head configured to print an image on a print medium;
   a communicator that receives a print command including a font command and character data, the font command specifying a font type and the character data specifying characters;
   storage that stores font data in a font table and relational information, the relational information indicating a relationship between the font type and a specific process corresponding to the font type; and a controller that
controls the communicator to receive the print command including the font command and the character data,
acquires, from the font table for the font type specified according to the font command, the font data for the characters specified by the character data in the print command,
generates print data by applying, to the acquired font data, the specific process corresponding to the font type specified by the font command according to the relational information, and
controls the print head based on the generated print data to print on the print medium,
wherein
the print head can print in color,
the relational information indicates a relationship between the font type and a color corresponding to the font type,
the specific process includes a process of colorizing the font data, and
the font data applied by the specific process is printed in the color corresponding to the font type.

8. A print data generating method of generating print data including font data as print data processed by a printer, comprising:
a step of receiving a print command including a font command and character data, the font command specifying a font type and the character data specifying characters;
a step of acquiring, from a font table for the font type specified according to the font command, the font data for the characters specified by the character data in the print command, wherein storage stores font data in the font table and relational information, the relational information indicating a relationship between the font type and a specific process corresponding to the font type; and
a step of applying to the acquired font data a specific process corresponding to the font type specified by the font command according to the relational information, wherein:

the printer that processes the print data can print in color,
the relational information indicates a relationship between the font type and a color corresponding to the font type,
the specific process includes a process of colorizing the font data, and
the font data applied by the specific process is printed in the color corresponding to the font type.

9. The print data generating method described in claim 8, further comprising:
a step of determining whether a specific code is included in the characters specified by the character data contained in the received print command; and
if the specific code is included, generating the print data to include font data to which the specific process is not applied.

10. The print data generating method described in claim 8, further comprising:
a step of acquiring, from the font table for a print font type corresponding to the font type specified by the font command according to the relational information, the font data for the characters specified by the character data in the print command,
wherein the relational information indicates a relationship between the font type specified by the font command and the print font type corresponding to the font type.

11. The print data generating method described in claim 10, further comprising:
a step of determining whether a specific code is included in the characters specified by the character data contained in the received print command; and
if the specific code is included, acquiring the font data of the font type specified by the font command.

12. The print data generating method described in claim 8, further comprising:
a step of displaying a screen for receiving input to set the relationship between the font type and the specific process corresponding to the font type; and
a step of updating the relational information stored in the storage based on the input to the displayed screen.

* * * * *